Figure 4:
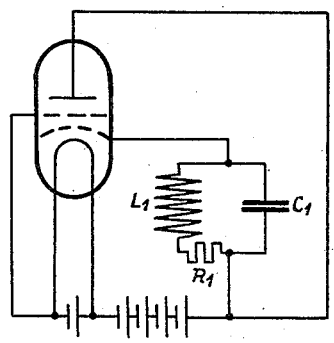

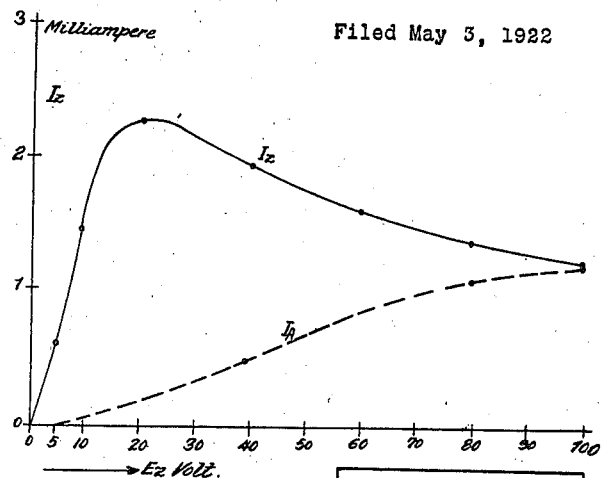
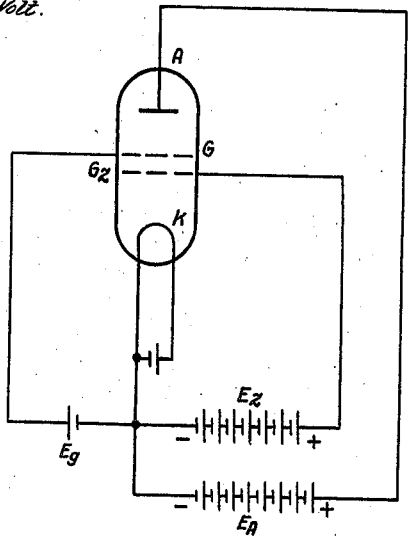
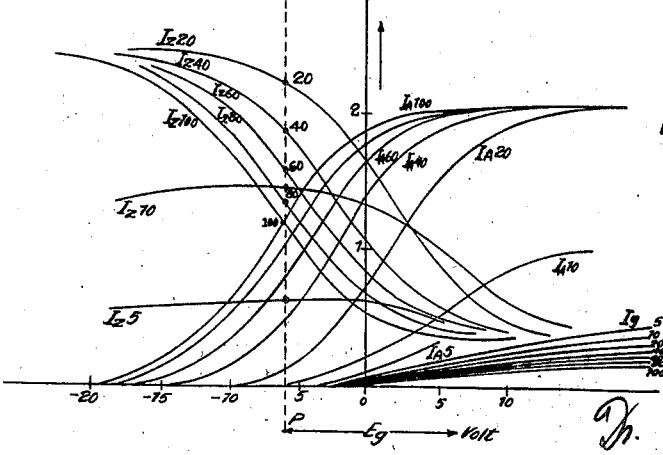

Patented Oct. 28, 1924.

1,513,010

UNITED STATES PATENT OFFICE.

HANS RUKOP, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

ARRANGEMENT FOR PRODUCING ELECTRICAL OSCILLATIONS.

Application filed May 3, 1922. Serial No. 558,298.

*To all whom it may concern:*

Be it known that I, HANS RUKOP, a citizen of Germany, residing at 12 Hallesches Ufer, Berlin, Germany, have invented certain new and useful Improvements in Arrangements for Producing Electrical Oscillations (for which I have filed application in Germany December 4, 1920), of which the following is a specification.

It is known that electrical oscillations can be produced by means of electrical discharge tubes (thermionic valves) provided with a cathode and an anode and a grid placed between the anode and cathode. The electrical oscillations are produced by causing an oscillatory circuit to take energy from the anode circuit in the proper phase relation and to impart a small part of this energy to the grid circuit through a reactive coupling. A corresponding circuit arrangement may be used in a vacuum discharge tube provided with a grid adapted to charge the space within the tube in the neighborhood of the ordinary grid. In this arrangement the grid placed nearest to the cathode is connected to a high continuous tension, while the second grid is used to produce the reactive coupling.

The present invention relates to a novel circuit arrangement for producing oscillations by means of electric discharge tubes provided with a space charging grid, or in general by means of tubes provided with a special positive electrode in the cathode space.

The invention is illustrated in the drawing in which—

Fig. 1 shows a circuit arrangement in connection with a vacuum discharge tube with two grids, an ordinary grid and a space charging grid, Fig. 2 shows sets of graphs that indicate the relationship between the currents in the circuits combined with a vacuum tube, Fig. 3 shows graphs which indicate the relationship between the anode current and the current flowing to the space charging grid when different voltages are applied to the space charging grid while the voltage applied to the ordinary grid is kept constant, and Figs. 4–8 are diagrammatic representations of circuits having various arrangements of resistance, inductance, and capacity.

The invention will be described in connection with a tube provided with a cathode, a space charging grid connected with a high positive potential, a grid connected to a low, or even negative, potential, and an anode connected to a high positive tension, these electrodes being arranged in the space within the tube in the order named (Fig. 1).

In electro-dynamics it is customary to speak of a "negative characteristic" and, when such a characteristic exists, to consider it possible to produce oscillations under certain conditions that relate to the values of an oscillatory circuit containing capacity and self-induction.

The term "negative characteristic" means that an electrical conductor allows less current to flow through it when the potential is raised, and vice versa.

At this juncture I will show how it is that a negative characteristic exists in the arrangement according to my invention. The circuit in which the negative characteristic is obtained is the one which, in Fig. 1, is formed by the cathode K, the battery $E_z$ and the grid $G_z$, and the negative characteristic appears more particularly in the gap between $K-G_z$.

This negative characteristic, which has nothing to do with secondary cathode radiations, nor with ionizations or the like, will be seen in Fig. 2, which consists of sets of curves or characteristics. The abscissæ of all of these curves represent various tensions of the grid $E_g$. The tension $E_z$ of the space charging grid, which is also variable, is used as a parameter, so that in the plotting of each curve a certain tension $E_z$ is applied to the space charging grid. The tension $E_A$ applied to the anode is the same for all points of all of the curves.

In Fig. 2 three kinds or sets of curves are plotted, the curves of the three categories being designated $I_A$, $I_z$ and $I_g$; $I_A$ denoting the current flowing to the anode, $I_z$ the current to the space charging grid, and $I_g$ the current to the ordinary grid. An index (20, 40, 60 etc.) affixed to each sign of reference indicates the parameter, i. e. the corresponding tension in volts applied to the space charging grid.

Although each of the curves $I_{z20}$, $I_{z40}$, $I_{z60}$ etc. slopes in the opposite direction to the curves $I_A$, they do not in themselves represent negative characteristics, because, although the ordinates indicate the currents of these curves, the abscissae indicate the tensions applied to the ordinary grid and not to the space charging grid, so that the curves $I_z$ do not represent the current of the space charging grid as a function of the potential applied to itself.

The negative characteristic of the space charging grid circuit can only be recognized when, at a certain constant tension $E_g$ applied to the ordinary grid and at a certain constant tension applied to the anode (the latter tension being constant in all cases in Fig. 2), the relationship between $I_z$ and $E_z$ is determined. This has been done for the point in Fig. 2 at which $E_g$ is equal to $-6$ volts (see broken line P), and the corresponding curve has been plotted as shown in Fig. 3. In this figure the descending characteristic or negative characteristic is seen between $E_z=20$ volts and $E_z=100$ volts.

In a discharge tube provided with a space charging grid there is a complicated relationship between $E_A$, $E_z$, $I_A$, $I_z$ because the current is always split up into parts which flow to the anode and the space charging grid, so that whenever either electrode is influenced a simultaneous influence is produced on the other, and since the sum of the two currents is always constant any such influence will give rise to mutual interaction between the anode and space charging grid. Thus an increase of the tension applied to the space charging grid will primarily cause the current through the space charging grid to be increased and hence give rise to a reduction of the anode current. A secondary effect, however, is produced which consists in the tension of the space charging grid being increased, which in turn causes the average potential at the ordinary grid to be increased, which results in an increase of the anode current and in a simultaneous decrease of the current through the space charging grid. Now the secondary effect generally tends to predominate, particularly when tensions are employed that exceed that required for saturation. This may be expressed by saying that the tension applied to the space charging grid also produces an effect that reaches through the grid and which is the real cause of the negative characteristic.

The negative characteristic can be utilized, in the first place, by connecting an oscillatory circuit in series with the gap in which the negative characteristic obtains. This is shown in Fig. 4 in which the oscillatory circuit shown is a circuit of the flywheel type. This series circuit is excited by means of the discharge tube under special conditions that will be hereinafter more fully explained.

In accordance with this invention a more general use of this property is to be made for circuits for producing oscillations, this being effected by causing a member which produces a sufficient drop of potential in the conductor leading to the space charging grid to produce an alternating voltage which automatically maintains the entire oscillation producing process.

This can be expressed in the following manner:

Let $i_A$ denote an alternating current passing through the anode, $i_z$ the alternating current through the space charging grid, $e_A$ the alternating voltage applied to the anode, $e_g$ the alternating voltage applied to the ordinary grid, $e_z$ the alternating voltage applied to the space charging grid, $\alpha$ the effect of the anode potential that reaches through the surface of the grid, $\zeta$ the effect of the potential applied to the space charging grid and that reaches through the surface of the ordinary grid, then $$i_A = f(e_g + \alpha e_A + \zeta e_z) \quad (1)$$

in which $f$ signifies a simple function. Now the anode conductor comprises a resistance R (which may consist of an oscillatory circuit of the flywheel type, that is a circuit in which $$R = \frac{L}{CR}$$

and the conductor leading to the space charging grid comprises a resistance Z. Hence from equation (1) it follows that $$i_A = f(e_g - \alpha R i_A - \zeta Z i_z) \quad (2)$$

It will be assumed here that the effect of the voltages on the currents, i.e. the function $f$, is a lineal one, which is really the case at small amplitudes, for example, and therefore suffices to explain the cause of the starting of the oscillations. We will therefore make $$f(e\cdots) = \frac{l}{Q} \cdot (e\cdots) \quad (3)$$

From this it follows that $$i_A = \frac{l}{Q} \cdot (e_g - \alpha R i_A - \zeta Z i_z) \quad (4)$$

Since, as was explained above, the anode current and the current flowing through the space charging grid go almost in opposite senses, because the total current is constant (current of saturation), it may be assumed that:

$$i_A = -i_z \quad (5)$$

so that $$i_A = \frac{l}{Q}(e_g - \alpha R i_A + \zeta Z i_A) \quad (6)$$

The idea underlying my invention may be embodied in circuit combinations of various forms. In Figs. 4–8, which represent such circuit arrangements, an alternating potential at the ordinary grid is dispensed with, this grid being directly connected to the cathode. This grid can even be completely insulated. For this reason the alternating potential at the grid will drop out of the equation (6) i.e.:

$$e_g = 0 \quad (7)$$

Figure 5:
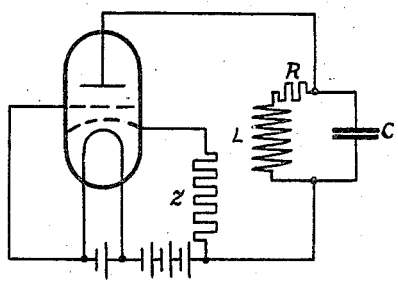

In Fig. 5 an oscillatory circuit, in which $$R = \frac{L}{CR},$$

is used in the anode circuit, while a non-inductive resistance Z is inserted in the lead to the space charging grid. The conditions to be satisfied in order to cause the oscillations to be automatically maintained are therefore, according to (6):

$$i_A = \frac{l}{Q} \cdot (-\alpha R i_A + \zeta Z i_A) \quad (8)$$

and hence $$\zeta Z = Q + \alpha R$$
$$\zeta Z = Q + \alpha \frac{L}{CR} \quad (9)$$

Figure 6:
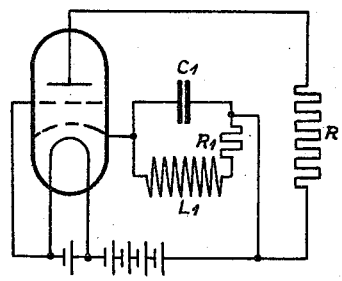

In Fig. 6, R is a non-inductive resistance, but $$Z = \frac{L_1}{C_1 R_1}$$

is an oscillatory circuit.

The law governing the conditions for an automatic maintenance of oscillations then is:

$$i_A = \frac{l}{Q} \cdot (-\alpha R i_A + \zeta \frac{L}{CR} i_A) \quad (10)$$

and hence $$\zeta \frac{L_1}{C_1 R_1} = Q + \alpha R \quad (11)$$

Figure 7:
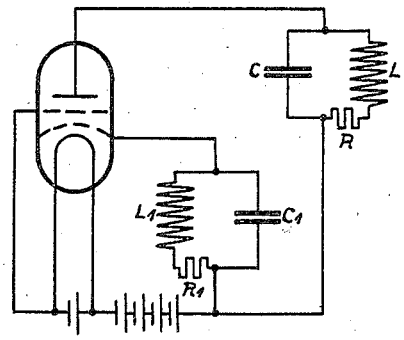

In Fig. 7 the two resistances in the anode lead and the lead to the space charging grid, comprise oscillatory circuits and a simple derivation will show that they should be tuned to each other as accurately as possible, although a mutual coupling is unnecessary.

The equation for the automatic maintenance of oscillations will then be:

$$\zeta \frac{L_1}{C_1 R_1} = Q + \alpha R$$
$$\zeta \frac{L_1}{C_1 R_1} = Q + \alpha \frac{L}{CR} \quad (12)$$

An advantage of this latter circuit combination is that the energy available for a useful effect is increased, because energy is supplied by both circuits, while in Figs. 5 and 6 a part of the energy is consumed in the non-inductive resistance R or Z.

Besides, the resistance in the anode lead can be dispensed with (Fig. 4), the conditions for the automatic maintenance of oscillations being then defined by the equation:

$$\zeta \frac{L_1}{C_1 R_1} = Q \quad (13)$$

The impedance in the lead to the space charging grid upon which the invention is based can, however, not be omitted because the conditions then obtaining would be expressed by:

$$Q = -\alpha \frac{L}{CR}$$

which cannot be realized; because Q, α, L, C, R are all positive under all conditions.

Figure 8:
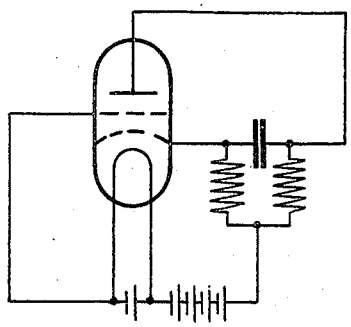

A simplification of the circuit arrangement can be effected by combining the anode circuit and the circuit of the space-charging grid $G_z$ so as to obtain the connections shown in Fig. 8, although this would not be necessary.

The principle of excitation hereinbefore described may also be partially employed by only partly fulfilling the conditions defined by the above mentioned equations and by adding, to a small extent, the well known reactive coupling by means of the ordinary grid. This may be effected by placing a coil in the lead to the ordinary grid and causing it to be affected by one or the other circuits by induction.

I claim:

1. An arrangement for producing electrical oscillations comprising a vacuum discharge tube with a cathode, a space charging positive electrode, a grid, and an anode arranged in the tube in the order named; circuits connecting the space charging electrode and the anode with the cathode; and means for exciting the oscillation-producing arrangement by the negative characteristic caused by the influence of the positive electrode on the average potential of the grid and hence on the anode current.

2. An arrangement for producing electrical oscillations comprising a vacuum discharge tube with a cathode, a space charging positive electrode, a grid, and an anode arranged in the tube in the order named; circuits connecting the space-charging electrode and the anode with the cathode; and means for exciting the oscillation producing arrangement by the negative characteristic caused by the influence of the positive electrode on the average potential of the grid and hence on the anode current, said means including an exciting resistance in the circuit of the positive electrode.

3. An arrangement for producing electrical oscillations comprising a vacuum discharge tube with a cathode, a space charging positive electrode, a grid, and an anode arranged in the tube in the order named; circuits connecting the space-charging electrode and the anode with the cathode; and means for exciting the oscillation producing arrangement by the negative characteristic caused by the influence of the positive electrode on the average potential of the grid and hence on the anode current, said means including an exciting oscillatory circuit in the circuit of the positive electrode.

4. An arrangement for producing electrical oscillations comprising a vacuum discharge tube with a cathode, a space-charging positive electrode, a grid, and an anode arranged in the tube in the order named; circuits connecting the space-charging electrode and the anode with the cathode; means for exciting the oscillation producing arrangement by the negative characteristic caused by the influence of the positive electrode on the average potential of the grid and hence on the anode current, said means including an exciting resistance in the circuit of the positive electrode; and means for delivering energy from the anode circuit.

5. An arrangement for producing electrical oscillations comprising a vacuum discharge tube with a cathode, a space charging positive electrode, a grid, and an anode arranged in the tube in the order named; circuits connecting the space-charging electrode and the anode with the cathode; means for exciting the oscillation producing arrangement by the negative characteristic caused by the influence of the positive electrode on the average potential of the grid and hence on the anode current, said means including an exciting impedance in the circuit of the space-charging positive electrode and means for delivering energy from the circuit of the space charging electrode.

6. An arrangement for producing electrical oscillations comprising a vacuum discharge tube with a cathode, a space charging positive electrode, a grid, and an anode arranged in the tube in the order named; circuits connecting the space-charging electrode and the anode with the cathode; means for exciting the oscillation producing arrangement by the negative characteristic caused by the influence of the positive electrode on the average potential of the grid and hence on the anode current, said means including an exciting impedance in the circuit of the space-charging positive electrode; and means for delivering energy from the anode circuit and from the circuit of the space-charging electrode.

7. An arrangement for producing electrical oscillations comprising, a vacuum discharge tube with a cathode, a space charging positive electrode, a grid, and an anode arranged in the tube in the order named; a direct connection between the cathode and the grid; circuits connecting the space-charging electrode and the anode with the cathode; and means for exciting the oscillation-producing arrangement by the negative characteristic caused by the influence of the positive electrode on the average potential of the grid and hence on the anode current.

8. An arrangement for producing electrical oscillations comprising, a vacuum discharge tube with a cathode, a space charging positive electrode, a grid, and an anode arranged in the tube in the order named; circuits connecting the space-charging electrode and the anode with the grid; means including an oscillatory circuit in the circuit of the space-charging electrode for exciting the oscillation-producing arrangement by the negative characteristic caused by the influence of the positive electrode on the average potential of the grid and hence on the anode current; and an oscillatory circuit in the anode circuit.

In witness whereof I hereunto set my hand in the presence of two witnesses.

Dr. HANS RUKOP.

Witnesses:
Laurence A. Hansen,
Doris Hoffmann.